(12) United States Patent
Hsieh et al.

(10) Patent No.: US 9,903,531 B2
(45) Date of Patent: Feb. 27, 2018

(54) COMBINABLE HANGER APPARATUS

(71) Applicant: XIX INC., New Taipei (TW)

(72) Inventors: Jung-Ya Hsieh, Hsinchu (TW); Ta-Wei Chien, New Taipei (TW); Yao-Tsung Yeh, New Taipei (TW); Shu-Ming Wei, New Taipei (TW); Cheng-Yu Tsai, New Taipei (TW); Kuo-Wei Lu, New Taipei (TW); Kuei-Yuan Chen, New Taipei (TW)

(73) Assignee: XIX INC., New Taipei (TW)

( * ) Notice: Subject to any disclaimer, the term of this patent is extended or adjusted under 35 U.S.C. 154(b) by 0 days.

(21) Appl. No.: 15/629,963

(22) Filed: Jun. 22, 2017

(65) Prior Publication Data

US 2017/0284595 A1 Oct. 5, 2017

Related U.S. Application Data

(62) Division of application No. 15/000,819, filed on Jan. 19, 2016, now Pat. No. 9,726,319.

(60) Provisional application No. 62/151,369, filed on Apr. 22, 2015.

(30) Foreign Application Priority Data

Jan. 6, 2016 (TW) .............................. 105100251 A

(51) Int. Cl.
H01R 13/60 (2006.01)
F16M 13/02 (2006.01)
H01R 25/00 (2006.01)

(52) U.S. Cl.
CPC .......... *F16M 13/02* (2013.01); *F16M 13/027* (2013.01); *H01R 25/006* (2013.01)

(58) Field of Classification Search
None
See application file for complete search history.

(56) References Cited

U.S. PATENT DOCUMENTS 3,189,866 A * 6/1965 Lazar ................... H01R 25/006
439/717

* cited by examiner

*Primary Examiner* — Tho D Ta
(74) *Attorney, Agent, or Firm* — ScienBiziP, P.C.

(57) ABSTRACT

A hanger apparatus includes a support base and at least one support frame. The support base has a containing groove, a fastening component, and at least one receiving slot. The containing groove has at least one locating device. The locating device is configured to secure the support base to a fixed structure. The fastening component is installed at two end portions of the support base. The fastening component is removably attached to a fastening component of another support base. The receiving slot detachably receives the support frame. The support frame has at least one support post and at least one support component. The supporting component is mounted at an end of the support post, and is configured to support a hanging object.

8 Claims, 8 Drawing Sheets

COMBINABLE HANGER APPARATUS

CROSS REFERENCE TO RELATED APPLICATION

This application is a divisional application of U.S. patent application Ser. No. 15/000,819, filed Jan. 19, 2016, which claims priority to U.S. Provisional Patent Application Ser. No. 62/151,369, filed Apr. 22, 2015, and Taiwan Patent Application Ser. No. 105100251, filed Jan. 6, 2016.

FIELD

The subject matter herein generally relates to suspension mechanisms.

BACKGROUND

A conventional hanger apparatus has a base and a hanger. The base is for mounting the hanger, and the hanger is for hanging or suspending an object. The base is mounted by a securing means onto a wall, a pillar, or a ceiling. The securing means could be screws, glue, or adhesive. However, the conventional hanger apparatus is not suitable for the demands of spatial display design due to the lack of systematic integration and extension. Furthermore, if power supplies are required, power distribution devices are difficult to erect, and the display design effect is decreased.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Implementations of the present technology will now be described, by way of example only, with reference to the attached figures.

DETAILED DESCRIPTION OF EXEMPLARY EMBODIMENTS

Figure 1:
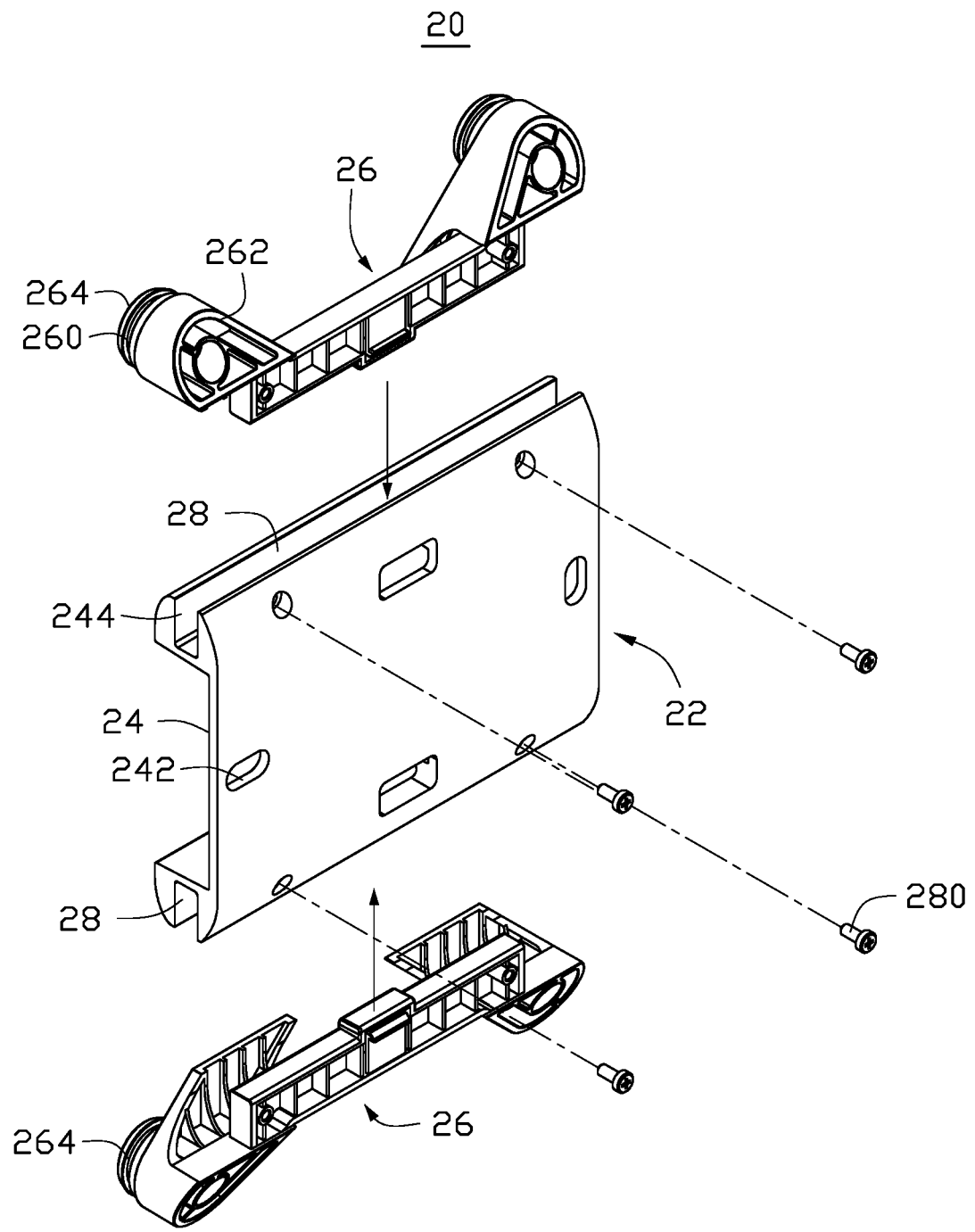
FIG. 1 is an exploded view of a first exemplary embodiment of a hanger apparatus of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

Definitions that apply throughout this disclosure will now be presented.

The term "comprising," when utilized, means "including, but not necessarily limited to"; it specifically indicates open-ended inclusion or membership in the so-described combination, group, series and the like.

FIG. 1 illustrates a first exemplary embodiment of a hanger apparatus 20. The hanger apparatus 20 comprises a support base 22, and at least one support frame 26. The support base 22 has a containing groove 24, a fastening component 244, and at least one receiving slot 28. The containing groove 24 has at least one locating device 242. The locating device 242 can be a through hole, a clamp, a screw and nut setup, etc. The locating device 242 is configured to secure the support base 22 to a fixed structure (not shown). The fixed structure is a wall, a pedestal support frame, or a vertical support frame. The pedestal support frame has a fixed base installed on a floor or ceiling, and one end of the support base 22 is secured to the fixed base, allowing the support base 22 to be fixed on the floor or ceiling. The vertical support frame has two fixed bases respectively installed on a floor and ceiling or respectively installed on two walls, and two ends of the support base 22 are respectively secured to the fixed bases, allowing the support base 22 to be fixed between the floor and ceiling or between the walls. The fixed structure can be any structure to secure the support base 22 but is not limited to the examples provided in the exemplary embodiment. The fastening component 244 is installed at two end portions of the support base 22, and the fastening component 244 can be a slot. The fastening component 244 is attachable with the fastening components 244 of other support bases 22 for infinite extensibility. The receiving slot 28 detachably receives the support frame 26. The support frame 26 has at least one support post 262 and at least one support component 264. The supporting component 264 is mounted at an end of the support post 262, and is configured to support a hanging object. A slit 260 is defined between the supporting component 264 and the support post 262 for hooking the hanging object.

In the present exemplary embodiment, the support frame 26 is secured to the support base 22 by a screw 280. The support frame 26 can be detached from the support base 22, the support base 22 can be interchangeable with different support frames 26 to support different hanging objects.

Figure 2:
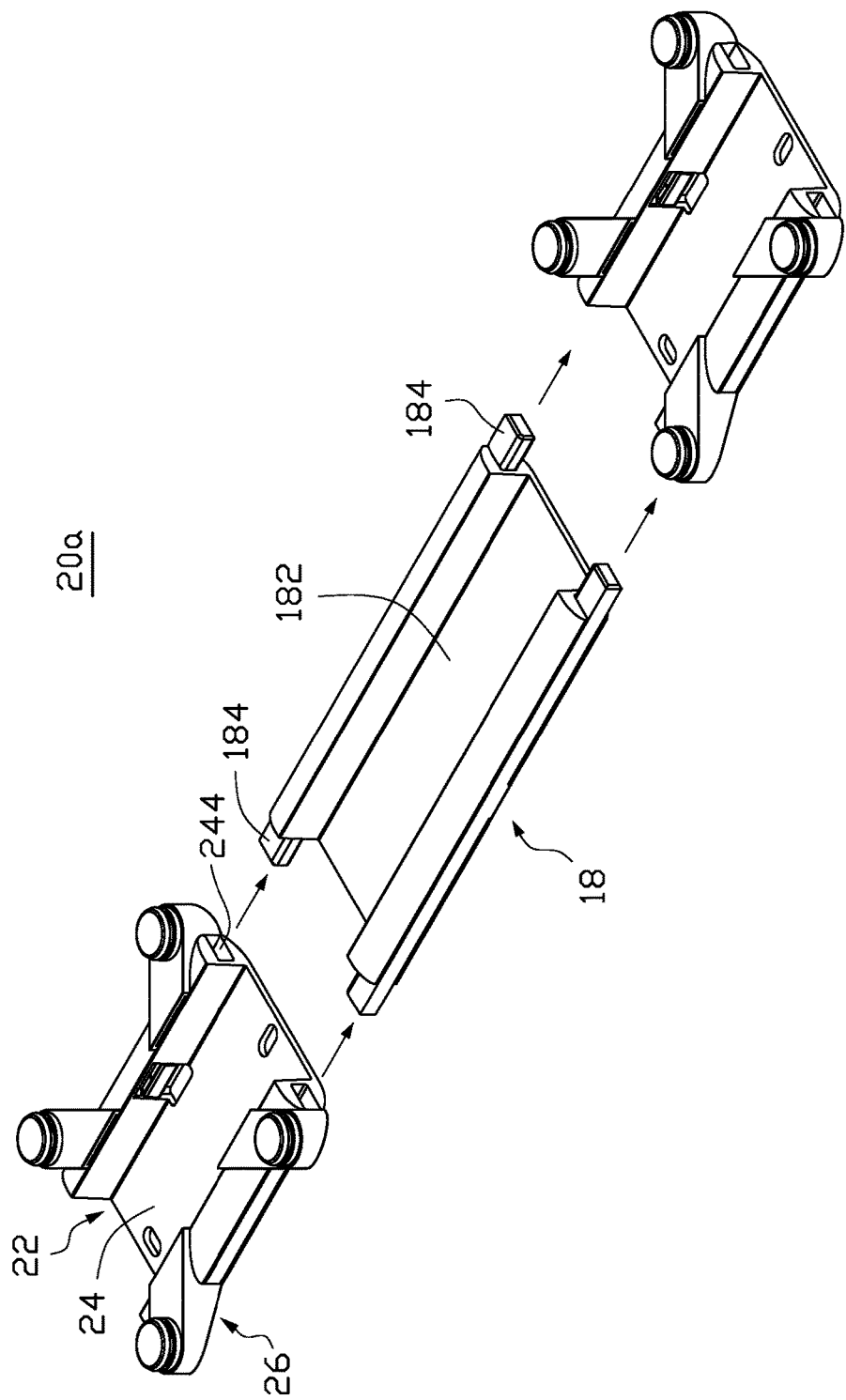
FIG. 2 is an exploded view of a second exemplary embodiment of a hanger apparatus of the present disclosure.
Figure 3:
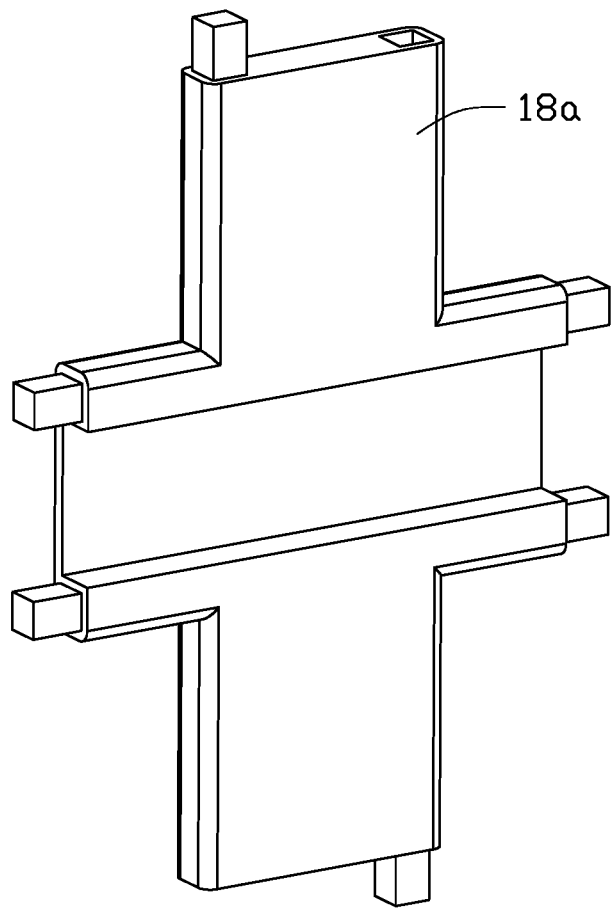
FIGS. 3 to 5 are perspective views of the second exemplary embodiment of an expansion component of the hanger apparatus of the present disclosure configured in various shapes.
Figure 4:
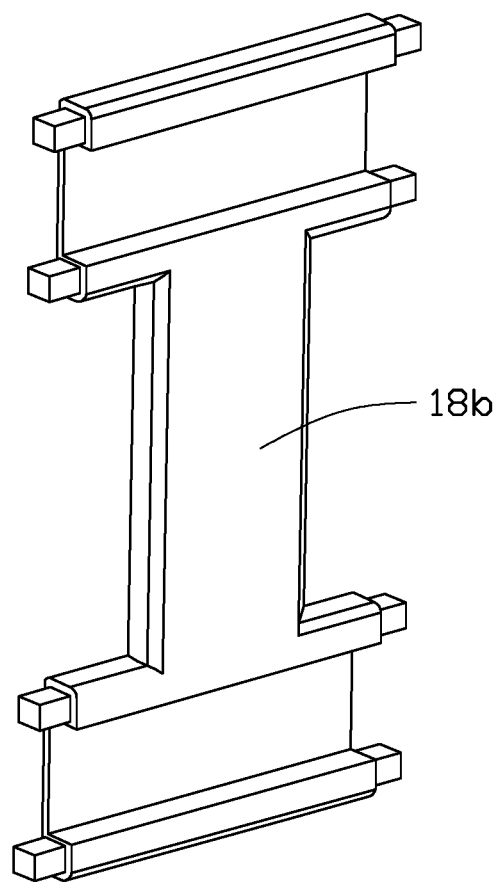
Figure 5:
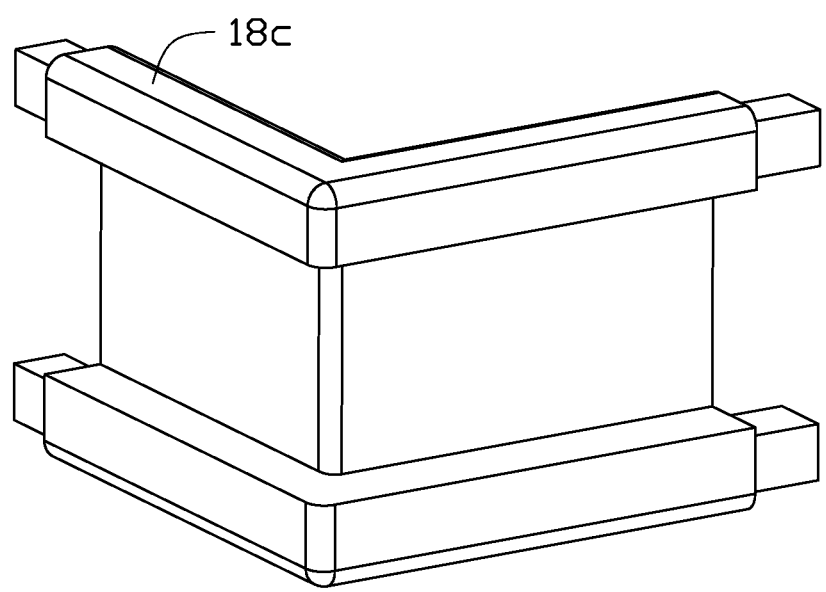

FIG. 2 illustrates a second exemplary embodiment of a hanger apparatus 20a. The hanger apparatus 20a comprises a support base 22, at least one support frame 26, and an expansion component 18. The support base 22 and the support frame 26 of the second exemplary embodiment are the same as those of the first exemplary embodiment. The expansion component 18 has a receiving groove 182 having the same configuration as the containing groove 24 of the support base 22. Two connection components 184 are respectively installed at two end portions of the expansion component 18. The connection component 184 and the fastening component 244 of the support base 22 are configured to be combined. In the present exemplary embodiment, the configuration of the expansion component 18 is a line-shape. The configuration of the expansion component 18a, 18b, 18c is preferably a cross-shape, an H-shape, or an L-shape as shown in FIGS. 3 to 5.

Figure 6:
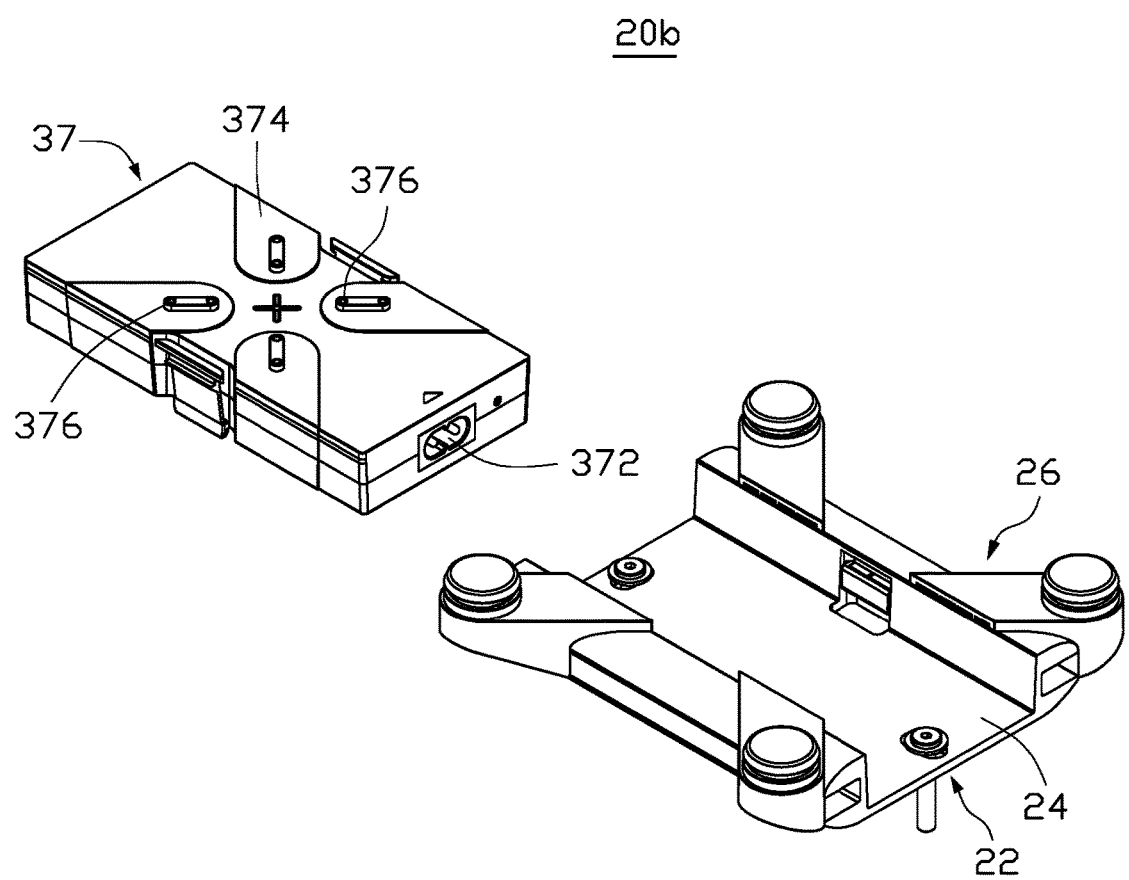
FIG. 6 is an exploded view of a third exemplary embodiment of a hanger apparatus of the present disclosure.
Figure 7:
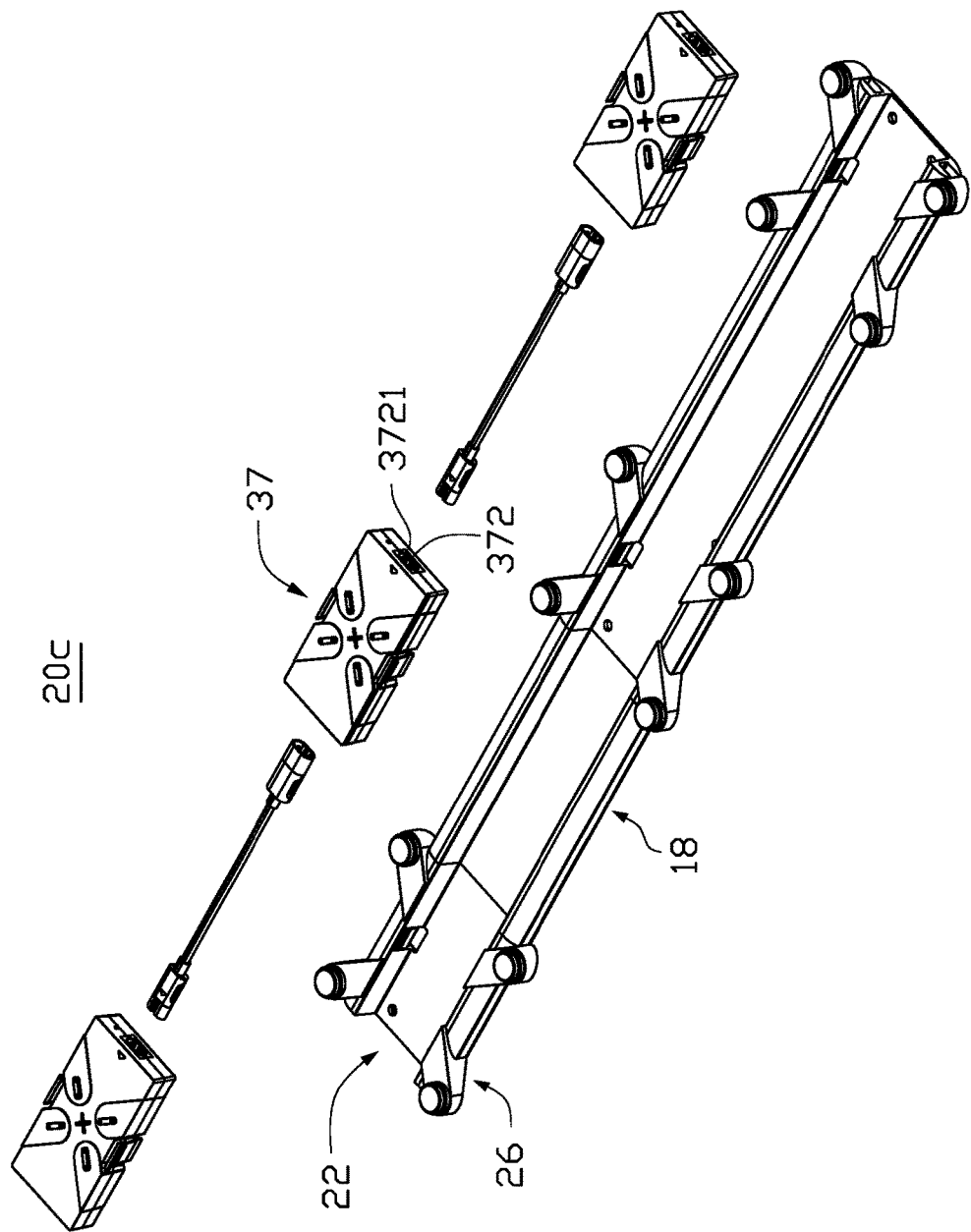
FIGS. 7 and 8 are front and rear exploded views of a forth exemplary embodiment of a hanger apparatus of the present disclosure.
Figure 8:
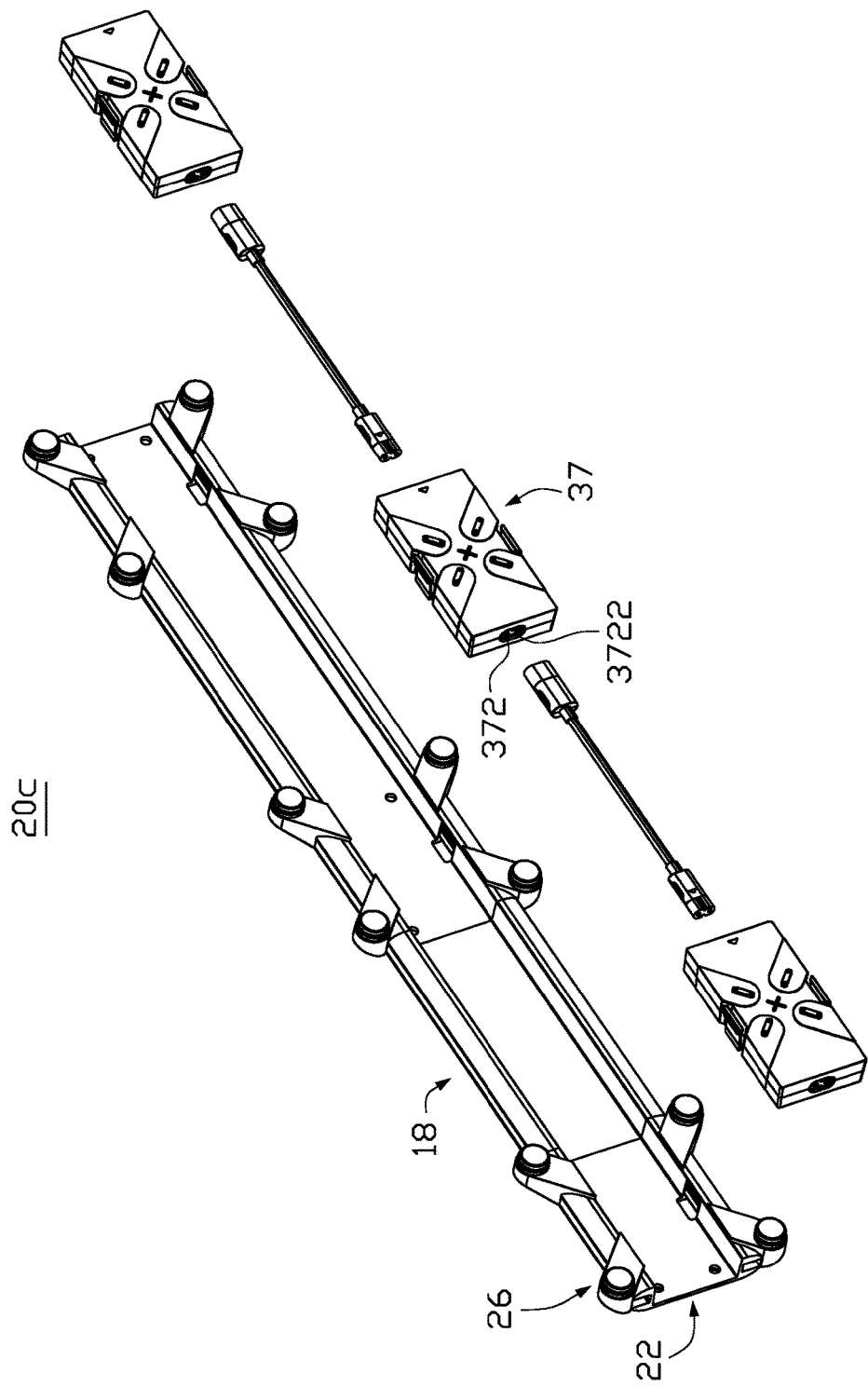

FIG. 6 illustrates a third exemplary embodiment of a hanger apparatus 20b. The hanger apparatus 20b comprises a support base 22, at least one support frame 26, and an electrical connecting device 37. The support base 22 and the support frame 26 of the third exemplary embodiment are the same as those of the first exemplary embodiment. The electrical connecting device 37 is installed inside the containing groove 24 of the support base 22. The electrical connecting device 37 has at least one electrical connecting socket 372 and a conductive connector 374. The electrical connecting socket 372 includes at least one input port 3721 and at least one output port 3722 as shown in FIGS. 7 and 8, and connects to a power source (not shown) and transmits power. The conductive connector 374 has at least one conductive terminal 376 installed at different locations.

FIGS. 7 and 8 illustrate a forth exemplary embodiment of a hanger apparatus 20c. The hanger apparatus 20c comprises at least one support base 22, at least one support frame 26, an expansion component 18, and at least one electrical connecting device 37. The support base 22 and the support frame 26 of the forth exemplary embodiment are the same as those of the first exemplary embodiment. The expansion component 18 of the forth exemplary embodiment is the same as that of the second exemplary embodiment. The electrical connecting device 37 of the forth exemplary embodiment is the same as that of the third exemplary embodiment.

The exemplary embodiments shown and described above are only examples. Many details are often found in the art such as the other features of a hanger apparatus. Therefore, many such details are neither shown nor described. Even though numerous characteristics and advantages of the present technology have been set forth in the foregoing description, together with details of the configuration and function of the present disclosure, the disclosure is illustrative only, and changes may be made in the details, including in matters of shape, size, and arrangement of the parts within the principles of the present disclosure, up to and including the full extent established by the board general meaning of the terms used in the claims. It will therefore be appreciated that the exemplary embodiments described above may be modified within the scope of the claims.

What is claimed is:

1. A hanger apparatus comprising:
   a support base; and
   at least one support frame; and
   wherein the support base has at least one containing groove, at least one fastening component, and at least one receiving slot, the containing groove has at least one locating device, the locating device is configured to secure the support base to a fixed structure, the fastening component is arranged at two end portions of the support base, the fastening component is removably attached to a fastening component of another support base, the receiving slot detachably receives the support frame, the support frame has at least one support post and at least one support component, the support post is connected to the support component, and the supporting component is configured to support a hanging object.

2. The hanger apparatus as claimed in claim 1 further comprising an expansion component having
   a receiving groove having the same configuration as the containing groove of the support base; and
   a connection component installed at an end portion of the expansion component; and
   wherein the connection component and the fastening component of the support base are configured to be combined.

3. The hanger apparatus as claimed in claim 2, wherein the configuration of the expansion component is a line-shape, a cross-shape, an H-shape, or an L-shape.

4. The hanger apparatus as claimed in claim 1 further comprising an electrical connecting device installed inside the containing groove of the support base, and having
   at least one electrical connecting socket connecting to a power source; and
   a conductive connector having at least one conductive terminal.

5. The hanger apparatus as claimed in claim 4, wherein the electrical connecting device includes at least one input port and at least one output port.

6. The hanger apparatus as claimed in claim 1, wherein the fixed structure is a wall, a pedestal support frame, or a vertical support frame.

7. The hanger apparatus as claimed in claim 6, wherein the pedestal support frame has a fixed base to which one end of the support base is secured, and the vertical support frame has two fixed bases to which two sides of the support base are secured.

8. The hanger apparatus as claimed in claim 1, wherein the supporting component is at an end of the support post, and a slit is defined between the supporting component and the support post.

* * * * *